United States Patent [19]

Richelli et al.

[11] Patent Number: 4,553,406
[45] Date of Patent: Nov. 19, 1985

[54] DEVICE FOR STORING AND AUTOMATIC DRAWING OF SO-CALLED INTERMEDIATE ELEMENTS, FOR LOADING, FEEDING AND DISCHARGE OF CERTAIN PRODUCTS, FROM A FREEZER TO HORIZONTAL PLATES

[76] Inventors: Angelo Richelli, Residenza Acquario, Milano 2 Segrate; Guido Battistella, Via Volturno 80, Brugherio Milano, both of Italy

[21] Appl. No.: 520,158

[22] Filed: Aug. 4, 1983

Related U.S. Application Data

[63] Continuation-in-part of Ser. No. 294,561, Aug. 19, 1981, Pat. No. 4,432,214, which is a continuation of Ser. No. 167,111, Jul. 6, 1980, abandoned.

[30] Foreign Application Priority Data

Aug. 4, 1982 [IT] Italy .............................. 22734 A/82

[51] Int. Cl.[4] .............................................. F25C 5/14
[52] U.S. Cl. ..................................... 62/341; 198/465.1
[58] Field of Search ................... 62/341; 414/152, 157, 414/202; 198/472

[56] References Cited

U.S. PATENT DOCUMENTS

| | | | |
|---|---|---|---|
| 2,830,462 | 4/1958 | Vettese | 414/157 |
| 2,965,049 | 12/1960 | Royer | 414/157 |
| 2,993,345 | 7/1961 | Franklin | 62/341 |
| 3,603,269 | 9/1971 | Royer | 414/152 |
| 3,955,376 | 5/1976 | Makenitsky et al. | 62/341 |
| 4,202,436 | 5/1980 | Kristapovich et al. | 198/472 |

*Primary Examiner*—Ronald C. Capossela
*Attorney, Agent, or Firm*—Kendrick, Netter & Bennett

[57] ABSTRACT

A device for storing and automatic drawing of so-called intermediate elements for loading, feeding and discharge of certain products, from a freezer to horizontal plates, having thereto connected a system outside of the freezer cabinet for carrying the intermediate elements coming out of the cabinet back to the cabinet inlet, characterized by comprising means outside of the cabinet for receiving and supporting said intermediate elements, a device being provided for bringing the intermediate elements coming out of the cabinet onto said means.

12 Claims, 8 Drawing Figures

DEVICE FOR STORING AND AUTOMATIC DRAWING OF SO-CALLED INTERMEDIATE ELEMENTS, FOR LOADING, FEEDING AND DISCHARGE OF CERTAIN PRODUCTS, FROM A FREEZER TO HORIZONTAL PLATES

This application is a continuation-in-part of U.S. Ser. No. 294,561 filed Aug. 19, 1981, now U.S. Pat. No. 4,432,214 issued Feb. 21, 1984 which is a continuation of U.S. Ser. No. 167,111 filed July 6, 1980 now abandoned.

This invention relates to a device for storing of so-called intermediate elements as extracted from a freezer to horizontal plates.

As well known, in such a freezer, or horizontal plate freezer, the loading or insertion of the products on the plate occurs by insertion of rows of products, each of which, as urged on the plate, urges the other rows of products previously placed on such a plate.

Since by such a system the products are urged against one another, it clearly appears that this would be possible only for products having suitable geometrical and physical characteristics, such as, for example, the case of products or packings thereof of rectangle parallelepiped and provided with sufficient rigidity.

On the other hand, it is not possible for other products to use such a system; for example, should the products be of frusto-conical or frusto-pyramidal shape, by urging the products against one another, undesirable overlapping of the products would occur.

Instead, should the product be of suitable geometrical shape, such as of rectangle parallelepiped shape, but not of sufficient rigidity, undesirable squashings of the products would occur.

In order to obviate to such a drawback, that is to make it possible to use a horizontal plate freezer also for products of the above mentioned type, or products that cannot be urged or pushed against one another, a device has been developed as described in the patent application No. 79.18968 filed in France on July 23, 1979 and corresponding U.S. patent application Ser. No. 294,561, filed Aug. 19, 1981 now U.S. Pat. No. 4,432,214.

Such a device solves the problem by using so-called intermediate elements, in each of which a row of products is housed or placed; each of the intermediate elements arriving on the freezer plate urge or push the other intermediate elements previously placed thereon, that is to say that the intermediate elements are urged or pressed against one another and not the products, the latter being housed in and simply trailed along by such intermediate elements. Obviously, should it be required for some products the use of said intermediate elements, this does not mean that in some cases such intermediate elements are not necessary and this occurs, according to the foregoing, in those cases where due to the shape and rigidity of the products, the latter can be urged or pushed against one another without any occurrence of drawbacks. In such cases, although such intermediate elements could be obviously used, it is however advisable to avoid the use thereof also in order to obtain the largest available surface, in the absence of said intermediate elements, which enables the insertion of a maximum amount of products in the freezer.

When desiring to remove the intermediate elements from the freezer and storing the same out of the freezer for some time interval, such operations are required that of course would require a not negligible amount of time and labour. Particularly, a not negligible drawback may consist in that the storehouse for the intermediate elements removed from the freezer may be located quite far away from the freezer.

It is the basic object of the present invention to provide means for simply and readily emptying the freezer, or removing of the intermediate elements, while storing such intermediate elements by rational use of the available space.

A device according to the present invention for the storing of intermediate elements removed from a horizontal plate freezer is essentially characterized in that, within a space adjacent the freezer cabinet and outside of the matter means are provided for receiving and supporting said intermediate elements, a device being also provided for drawing one by one the intermediate elements removed from the cabinet and moving the same still one by one on said means for receiving and supporting the intermediate elements.

In order that the features and advantages of a device according to the present invention be more clearly shown, an exemplary embodiment of a device according to the present invention will now be described with reference to the accompanying schematic drawings, in which.

The above mentioned assembly comprises a freezer designated as a whole at 1, essentially including a cabinet 2 with insulating walls, within which the products to be preserved are frozen. Within the freezer there is a set of refrigerating plates, each of which being designated at 3, and on which the products are placed.

When all of the plates 3 are loaded with products, the plate assembly halts for a predetermined time interval within the bottom of said freezer 1, or cabinet 2.

When desiring to remove the frozen products from the freezer, and to insert at the same time fresh products to be frozen, said plates 3 are one by one lifted and each halts for some time interval at the level of the inlet and outlet openings A and B, respectively.

Figure 1:
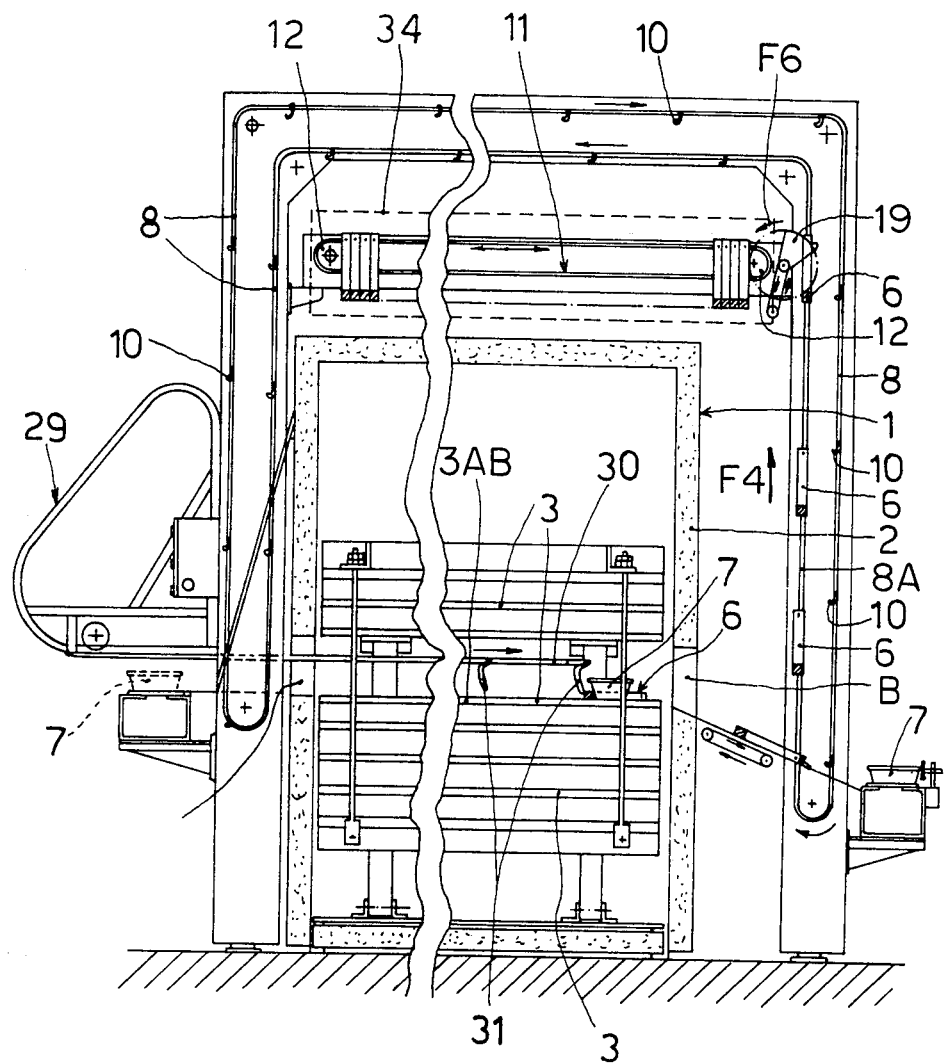
FIG. 1 is a longitudinal sectional view taken along a vertical plane and showing an entire assembly comprising a horizontal plate freezer, an intermediate element conveying system, and a device for storing said intermediate elements.
Figure 2:
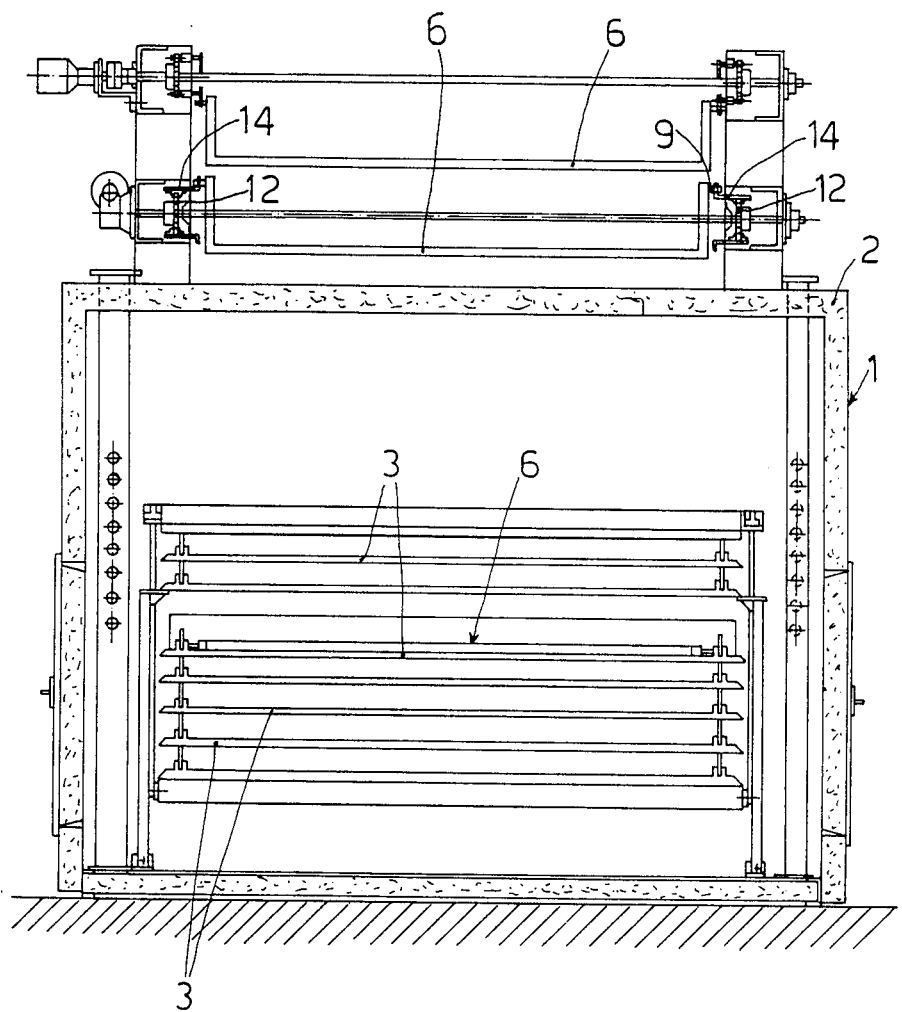
FIG. 2 is a cross-sectional view, also taken along a vertical plane perpendicular to that of FIG. 1, and showing the same assembly.

During such a time interval, at which a plate 3 halts at such a position, designated at 3AB of FIG. 1, the following repeats for some times.

Through the inlet opening A by means independent of the present invention a row of products, incoming from a conveyor 4 in the direction of arrow F1 is urged or pushed on the plate 3 within the cabinet 2, and thus said row of products urges or pushes all of the rows of products lying on said plate 3 located at the level of said openings A and B. Thus, a row of products is ejected out of the cabinet 2 through the outlet opening B.

By means independent of the present invention the products are moved away by a conveyor 5 in the direction of arrow F2 to further locations.

As earlier described in the patent application No. 79.18968 filed in France on July 23, 1979, for some types of products such rigid elements as commonly referred to as "intermediate" elements are used for urging or pushing said products onto the plates within the freezer.

More particularly, when desiring to insert products in the freezer which for the geometrical shape thereof, such as frusto-conical, frusto-pyramidal, cylindrical shape and the like, and/or for insufficient rigidity would make practically impossible a process as that above mentioned, in which a row of products urges or pushes the other rows of products placed on the refrigerating plate, because of overlappings and squashings of the products, such elements as said intermediate elements would be used.

For example, a possible type of intermediate element is designated at 6 on the accompanying drawings, and is substantially U-shaped.

Figure 8:
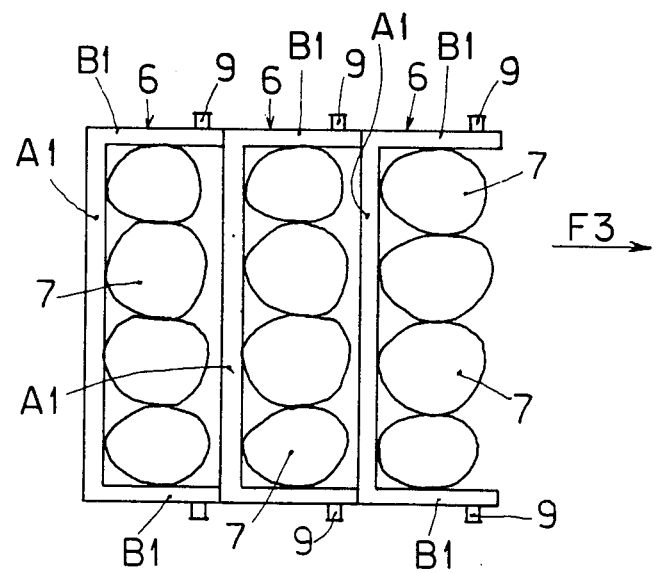
FIG. 8 is a plan view of the intermediate elements within the freezer, in each of which a row of products is placed.

On the refrigerating plate and within the freezer the intermediate elements with the products are presented as shown in FIG. 8.

Withing each intermediate element there is one row of products 7.

Therefore, when under the push of an intermediate element arriving at on the plate 3AB through the inlet opening A, all of the intermediate elements are practically displaced, each intermediate element moving in the direction of arrow F3, as shown in FIG. 8, provides for urging the adjacent element by pressing there against.

More particularly, the ends of the two side branches B1 of an intermediate element will press in the direction of arrow F3 on the side A1 of the next intermediate element, while the products 7 within an intermediate element are merely urged or pushed by the side of said intermediate element, but are not urged or pressed against the side A1 of the next intermediate element, because of being sufficiently spaced apart from said side.

Figure 3:
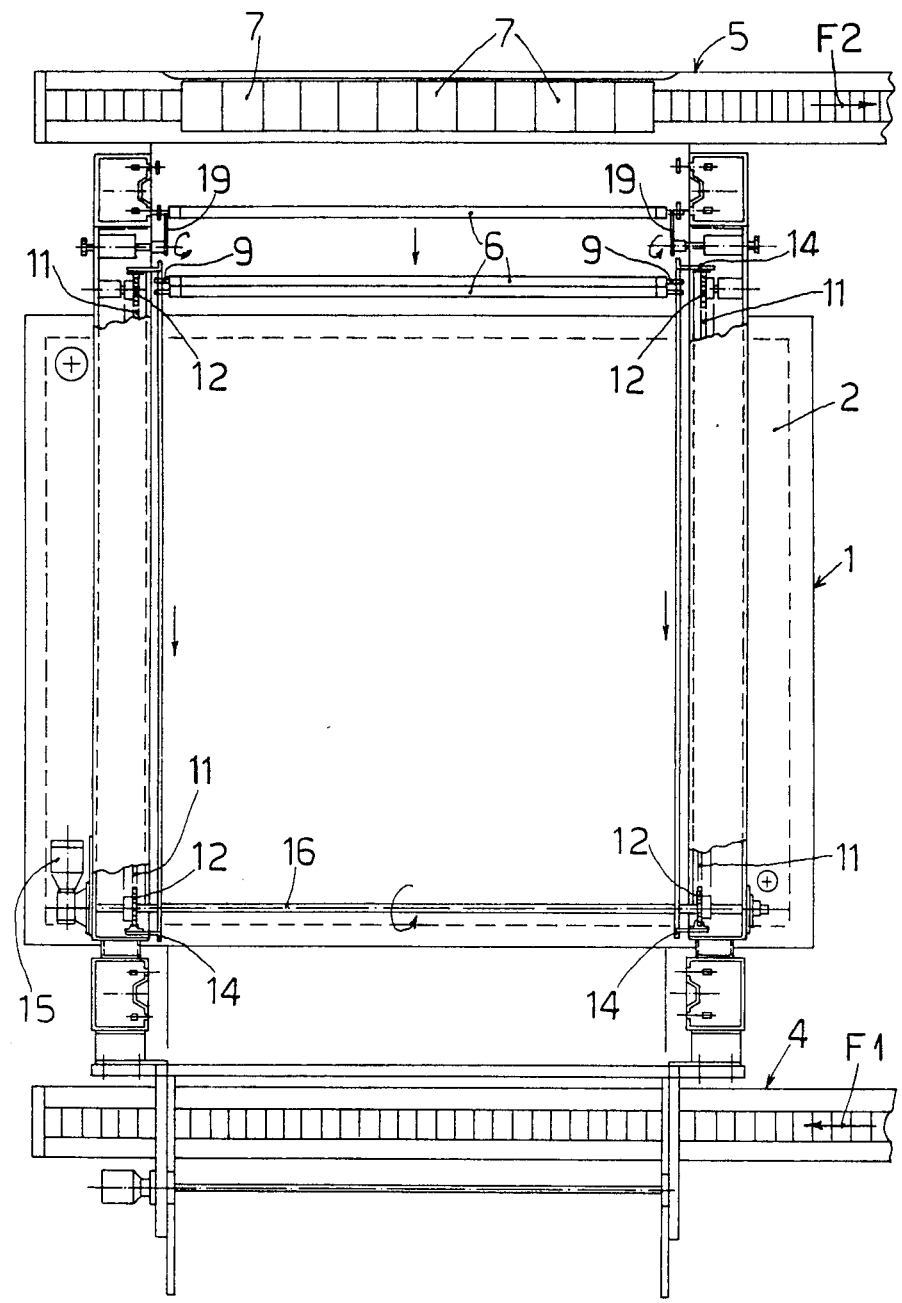
FIG. 3 is a plan view of said assembly.

As described in the above cited patent application, following the outlet of an intermediate elements with the products 7 from the outlet opening B, the products are moved away by a conveyor, designated at 5 in FIG. 3, and the intermediate element is automatically coupled or hooked to two chains 8.

More particularly, the two chains 8, which are quite identical to each other, respectively lie on two parallel vertical planes and each of the looped chains has the shape as clearly shown in FIG. 1.

The intermediate element 6 carries two projecting pins 9 and the latter, after the removal of the intermediate element out of the outlet opening B, are taken respectively by two hooks 10 of the two chains 8.

The intermediate element 6 is thus lifted in the direction of arrow F4 (see FIG. 1) by the upward run 8A of chain 8, or by two upward runs respectively pertaining to said two chains 8.

Then, such an intermediate element moves back as carried by said chains to the inlet opening A. Suitable pushing means urge or push a fresh intermediate element with a new row of products 7 through the inlet opening A on the refrigerating plate 3AB. Thus, the above described operations are repeated until the whole plate 3AB has been released of the frozen products and has been filled again with products to be frozen.

Then such a plate is lifted and its place is taken by another plate at said openings A and B and the same above described operations will be repeated.

As above pointed out, such intermediate elements are highly useful, serving for effective solution of the problem when having to urge or push and advance on the refrigerating plates such types of products that cannot practically be urged or pressed against one another.

On the other hand, when having to insert in the freezer such products as products not giving rise to such a problem, or products that can be urged or pushed against one another without any occurrence of drawbacks, for example quite rigid products of right angle parallelepiped, the use of said intermediate elements could be dispensed of, and in such cases it could be advisable to dispense with the use of the intermediate elements also in order to have a larger available surface on the refrigerating plate, thus to fill said plate with a larger amount of products. In other terms, a freezer comprising a set of plates could in such a case house or receive a larger amount of products.

A device representing an exemplary embodiment of the present invention, and shown in the accompanying drawings, comprises a room or storehouse for accomodating the intermediate elements outside of the cabinet 2, means for rapidly carrying the intermediate elements into said storehouse, where such intermediate elements are allowed to stay or halt as long as desired, and means for rapidly bringing the intermediate elements back onto the plates 3 within the cabinet when the use of such intermediate elements is again required.

The intermediate element storing means comprise within a space outside of and above said cabinet 2 of the freezer two looped chains, respectively lying in two parallel vertical planes.

As hereinafter further explained, said chains are suitable to support said intermediate elements, each of which is suspended by its two small pins 9 to two small supports carried by the chains. Each chain, designated as a whole at 11 in FIG. 1, is stretched out or taut between two gears 12 rotatably carried by supports or bearings fixed to the frame 18.

The chain comprises parts or portions 17 having secured thereto small supports 14 intended for supporting the pins 9 of said intermediate elements 6.

Each small support 14 has two seats both of which designated at S1, and each of said seats can accomodate a pin 9. A suitable electric motor, such as that designated at 15 of FIG. 3, operates a shaft 16, the latter being rotatably carried by supports integral with said frame 18. Said shaft 16 has keyed thereto two gears 12 respectively meshing with said two chains 11. Therefore, upon operation of motor 15, the two chains 11 are simultaneously operated.

In order to bring the intermediate elements 6 on said chains 11, means are provided as comprising two cams 19 lying on parallel vertical planes and respectively located at said two chains 11.

A cam 19 is integral with a shaft 20 carried by bearings 21 and 22 from a support 26 integral with said frame 18.

A motor 25, fixed to said frame, operates a gear 24 and the latter operates through a chain a gear 23 integral with said shaft 20.

Actually, said motor 25 simultaneously operates both of said cams 19 through suitable connections, said cams rotating about a geometrical axis Z, or axis of rotation for both cams.

Each cam 19 includes a cavity 27 and a protruding portion 28. Said cavity 27 is suitable to receive a pin 9 of the intermediate element 6, and said protruding portion 28 forms an engagement tooth for acting in turn on said pin 9, as hereinafter discussed.

At some time during the rotation of said cam 19, said cavity 27 will pass at the above mentioned upward run 8A (see FIG. 1) of the chain 8 for conveying the intermediate elements 6 outside of the freezer cabinet 2.

At each cam 19 there is provided a fixed wall 32 serving with its shaped edge 33 as a guide, as shown in the following, for the cam driven pin 9.

The operation of the intermediate element storing device is substantially as follows.

When desiring to empty or release the cabinet 2 of the intermediate elements 6, for example for the insertion of products not requiring any use of such intermediate elements, or for cleaning and maintenance operations or for other purposes, an operator will see the following operations by a control.

A device, designated as a whole at 29, is operated and drives a pushing member 30 provided with pushing elements 31 for acting on said intermediate elements. This pushing member 30 advances by one "step", or a sufficient amount to expel through the outlet opening B an intermediate element 6, the latter containing or not said products 7.

The ejected intermediate element is caught by the chain 8, and particularly two hooks 10 pertaining to the two upward runs 8A of the chain respectively hook or couple the two protruding pins 9 of the intermediate element.

Said chain 8 first moves and then stops, more particularly stopping just when and intermediate element carried by said run 8A arrives at said cams 19.

On rotating in the direction of arrow F6, each cam 19 arrives with its cavity 27 at a pin 9, so that the latter in the relative movement is inserted in said cavity 27, whereby the two pins 9 of the intermediate element are simultaneously caught by the two cams 19. Each pin 9, on being caught by a cam 19, disengages from the corresponding hook 10 of said chain 8, in which it was inserted.

Then the or each pin 9, as driven by said cam 19, slides along the fixed edge 33 acting as a guide. On moving on said guide 33, as driven by said cam 19, the pin 9 moves to the outlet of cavity 27 and, when arriving at said chain 11, said pin comes completely out of the cam cavity 27 and settles on a seat S1 of a small support 14 carried by said chain 11.

Thus, the two pins 9 of the intermediate element are supported by the two small supports 14 of said two chains 11, respectively. Now, said cam 19 comes to a stop.

The or each chain 11 which, at the time of arrival of pin 9 on the small support 14, was stationary, is now moved and displaced by one "step", or an amount enabling a next seat S1 to arrive exactly at the location occupied by said seat S1, which had received the pin 9 coming out of the cam cavity 27.

Thus, the new or second seat S1 is at the position for receiving the next pin 9, or a pin 9 of the next intermediate element 6, which as the preceding intermediate element will be drawn by cams 19.

Then, the above described operations will be repeated, that is another intermediate element 6 will be ejected from the cabinet 2 through the outlet opening B through the action of the pushing member 30, and an intermediate element, carried by the upward runs 8A of chains 8, will come to a stop at said cams 19. As in the above described case, the latter will move in cooperation with the fixed guides 33 two pins 9 of the intermediate element to the two seats S1 which, as above discussed, have come to the position for receiving said pins. The chains 11 will move by a further "step" to set two new seats S1 at such a position. Thus, all of the intermediate elements of a plate 3 will one by one reach the location on said chains 11.

Then, a new plate 3 carrying the intermediate elements arrives at said openings A and B, exactly at the location of that previously considered, which completely released of the intermediate elements is moved away from said position.

By so operating, the plates 3 are one by one emptied or released of the intermediate elements. The latter, as the operation proceeds, are piled up on the small supports 14 of said chains 11. At some time, said cabinet 2 will be completely emptied and all of the intermediate elements 6 will be arranged on said chains 11. Now, that device is stopped for the cabinet emptying and storage of the intermediate elements in the "magazine", or on the chains 11.

Later, when desiring to use again said intermediate elements, the latter will be removed from the "magazine" or chains 11 and taken back into the cabinet 2 on said plates 3. Substantially, the following operations will occur.

As to the drawing of each intermediate element from said chains 11, the following movements are effected.

Figure 4:
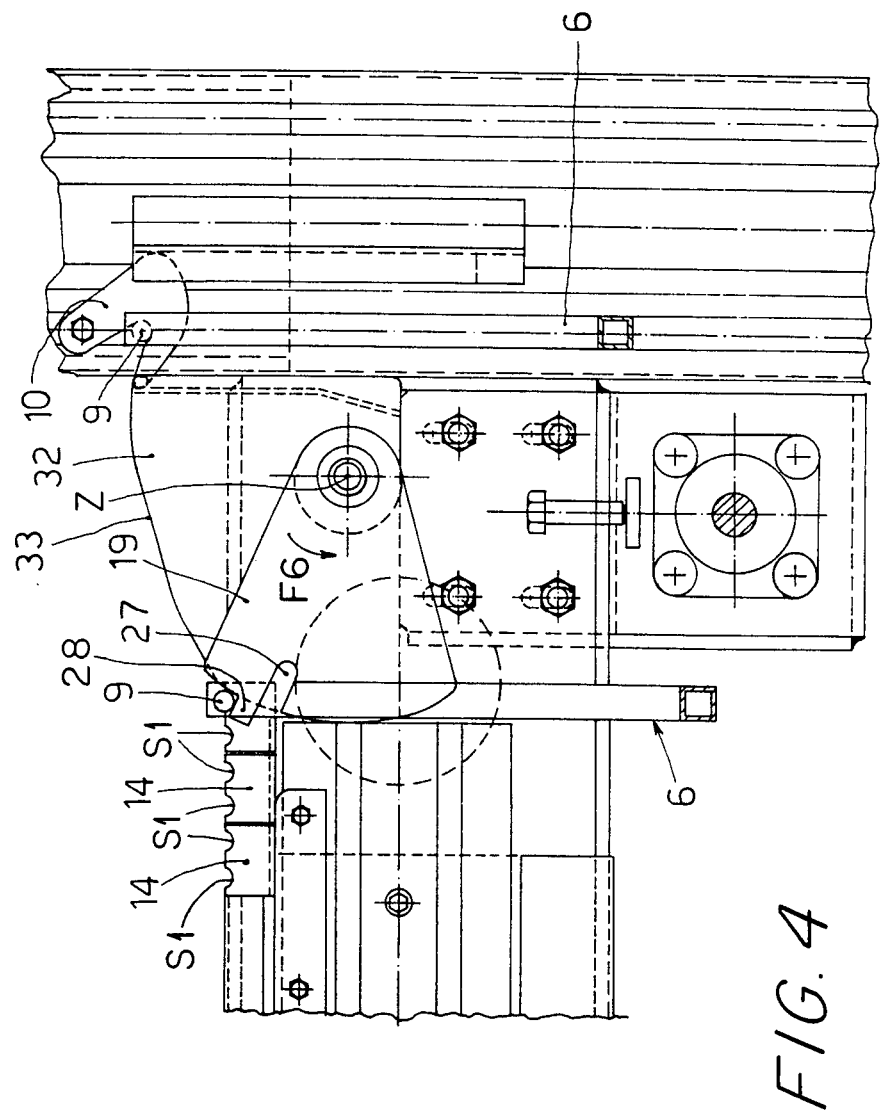
FIG. 4 is a view on enlarged scale relative to the FIGS. 1–3, showing a detail of the device for the storing of the intermediate elements.
Figure 5:
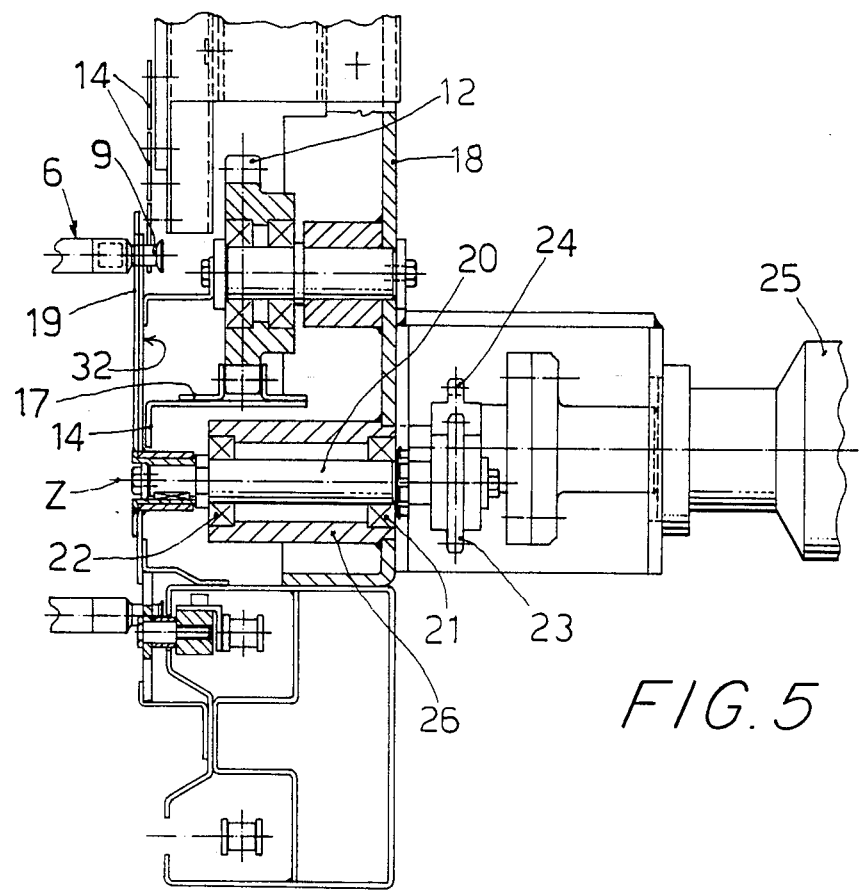
FIG. 5 is a view also on enlarged scale showing a sectional detail of said storing device.
Figure 7:
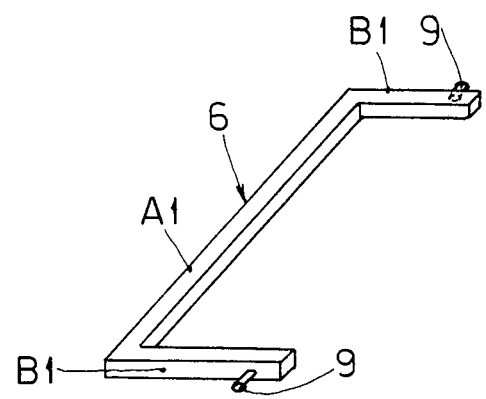
FIG. 7 is a perspective view of an intermediate element.
Figure 6:
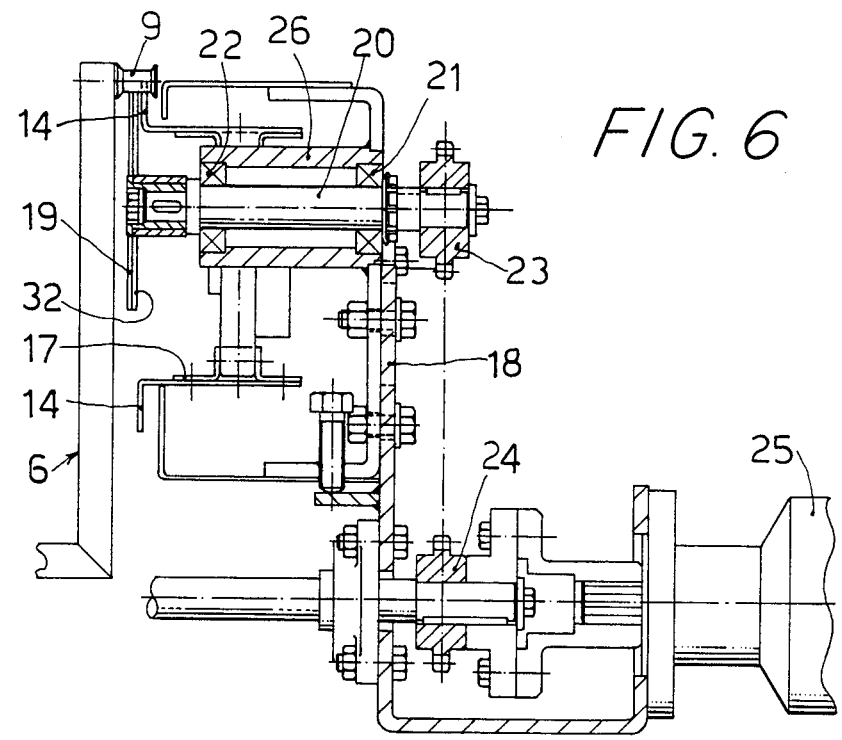
FIG. 6 is a view also on enlarged scale showing a detail of said storing device.

The intermediate element, as carried by said chains 11 moving in the opposite direction to that of the above described chain loading step, comes to a stop, as the chains stop, when arriving at said cams 19, that is at the position shown in FIG. 4. At such a position, each pin 9 is above the cam projection or "tooth" 28. The cam 19 is rotated in the opposite direction to that of arrow F6 and brings the pin 9, as urged or pushed by said tooth 28 in cooperation with guide 23 in engagement with the hook 10 of said chain 8.

Now, this chain 8 at stationary condition with a hook 10 at said position is driven and said run 8A of the chain (see FIG. 1) starts to upward move in the direction of arrow F4 shown in FIG. 1.

Just a bit later said chain 8 comes to a stop when another hook 10 arrives at said position, shown in FIG. 4, where it is enabled to receive a pin 9.

Such a movement of chain 8, which has upward moved away the interdiate element coming out of the magazine, has brought on the opposite side of the machine an intermediate element at the inlet opening A.

On arriving at the inlet opening A, the intermediate element 6 is urged or pushed by the device 29 and enters the freezer cabinet 2 through said inlet opening A, thereby arriving at upon a horizontal plate 3.

The cams 19 will then bring another intermediate element on the hooks 10 of said chains 8, which intermediate elements has been in the meanwhile brought by a movement of said chains 11 to the suitable position for drawing by said cams. The above described operation is repeated, so that through said inlet opening A another intermediate element arrives on the plate 3 in the freezer.

Thus continuing, the plate is filled up, and then is displaced and replaced by another plate, that is arriving at said openings A and B.

The new plate will also be loaded with intermediate elements as the preceding plate, and thus all of the plates are one by one loaded.

In the above described example, one pair of chains 11 provided for the support of the intermediate elements 6 removed from the freezer. Said pair of chains substantially form a bearing plane, that is the two small supports 14 of the two chains 11 form said bearing plane. Two or more pairs of chains 11 could also be provided, that is said bearing planes could be also in number of two or more.

Provision could also be made for a shell or envelope, such as that schematically shown by hatching in FIG. 1 and designated at 24, enclosing the space in which the intermedite elements are stored on said chains 11.

Means can be provided for injecting a flow of suitable fluid into said shell or envelope for the purpose of flushing or washing the intermediate elements 6, and similarly means for drying said intermediate elements, for example by a flow of hot air.

The advantages provided by the above described device are evident. Particularly, and advantageous feature is the rapid emptying of the plates and simultaneous arrangement of the intermediate elements in the magazine, or on chains 11.

Particularly, in the above described example, the rational location or positioning of the magazine should be appreciated, wherein said magazine or chains 11 utilize a space above the cabinet 2 without giving rise to an increased floor space. In other terms, in a plan view the machine will have the same size. Of course, in addition to the above described example, changes can be made still within the scope of the present invention.

Particularly, such changes may involve the means, which may be different than said chains 11, for supporting the intermediate elements coming out of the freezer, as well as the means for bringing the intermediate elements on such supporting means and bringing the intermediate elements back into the freezer. Other changes or various expedients may be made to the machine.

For example, in the absence of intermediate elements on the plates 3, such operations can be provided as plate cleaning and/or drying by members, such as brushes or the like, applicable to said pushing member 30 usable for intermediate element ejection.

For example, by operating with a suitable brush on said plates 3 and by means of said pushing member 30, each plate is preset to best conditions for receiving the products with or without the intermediate elements.

What is claimed is:

1. A device for automatic storing and for recovering from storage, elements for loading, feeding and unloading products from a horizontal plate freezer, said freezer including a conveying system for said elements outside said freezer for conveying said elements from the freezer outlet to the freezer inlet, and, outside and adjacent thereto, means for receiving, supporting and storing said elements, including means for carrying elements exiting said freezer one by one onto said receiving, supporting and storing means.

2. A device according to claim 1 wherein said receiving, supporting and storing means are located above said freezer and adjacent said conveying system outside said freezer.

3. A device according to claim 2 wherein said element supporting means comprise at least one pair of closed-loop chains which, in two parallel horizontal runs, support said elements on supporting elements carried by said chains.

4. A device according to claim 3, further comprising kinematic means for drawing said elements from said conveying system onto said receiving, supporting and storing means, and said kinematic means comprises two suitably shaped rotating cams for drawing said elements one-by-one from hooks on said chains of said conveying system, and for carrying said elements onto supporting means in said intermediate element receiving and supporting means, said supporting means being operable to move an intermediate element toward and away from said cams.

5. A device according to claim 4, further comprising controllable means for pushing a plurality of elements on a plate inside said freezer onto said conveying system for carrying said elements to said cam means, for stopping said conveying system when an element reaches said cams, and for transferring said element by operation of said cams onto said supporting means.

6. A device according to claim 4, wherein each cam has a recess into which a pin on said element seats and separates from a chain in said conveying system, said cam being operable to carry said pin onto said supporting means.

7. A device according to claim 6, wherein each of said cams comprises at said recess a protruding portion forming an engagement means for drawing the pin on an intermediate element from said supporting means and onto a hook on said conveying system.

8. A device according to claim 6, wherein the chains forming part of said supporting means include supporting elements having seats for receiving and supporting pins carried by said elements.

9. a device according to claim 1 wherein said elements are C-shaped or U-shaped.

10. A device for automatic storing, and for recovering from storage, elements for pushing products across the plates of a horizontal plate freezer, said freezer including a conveying system for said pushing elements outside said freezer for conveying said elements from the freezer outlet to the freezer inlet and, outside and adjacent thereto, means for receiving, supporting and storing said pushing elements, including means for carrying said elements exiting said freezer one by one, onto said receiving, supporting and storing means.

11. The device of claim 10 wherein said receiving, supporting and storing means are located above said freezer and adjacent said conveying system outside said freezer.

12. The device of claim 11 further comprising means for drawing said pushing elements from the conveying system onto said receiving, supporting and storing means one by one.

* * * * *